(12) United States Patent
Fujimura et al.

(10) Patent No.: US 9,720,445 B2
(45) Date of Patent: Aug. 1, 2017

(54) ELECTRONIC DEVICE DISPLAY HAVING MULTIPLE PARTITIONS

(71) Applicant: Motorola Mobility LLC, Chicago, IL (US)

(72) Inventors: Toshihiro Fujimura, Chicago, IL (US); Eric Berdinis, Chicago, IL (US); Nathan J. Fortin, Morgan Hill, CA (US)

(73) Assignee: Motorola Mobility, LLC, Chicago, IL (US)

( * ) Notice: Subject to any disclaimer, the term of this patent is extended or adjusted under 35 U.S.C. 154(b) by 0 days.

(21) Appl. No.: 14/844,562

(22) Filed: Sep. 3, 2015

(65) Prior Publication Data

US 2017/0068273 A1    Mar. 9, 2017

(51) Int. Cl.
*G06F 1/16*    (2006.01)

(52) U.S. Cl.
CPC ................ *G06F 1/1637* (2013.01)

(58) Field of Classification Search
CPC .......................... G06F 1/1647–1/165
See application file for complete search history.

(56) References Cited

U.S. PATENT DOCUMENTS

| 8,502,788 B2 * | 8/2013 | Cho ................ G06F 1/1626 345/173 |
| 2011/0210907 A1 * | 9/2011 | Martin-Cocher . G06F 17/30905 345/1.3 |
| 2015/0378391 A1 * | 12/2015 | Huitema ................ G06F 1/163 361/679.03 |

* cited by examiner

*Primary Examiner* — Anthony Q Edwards
(74) *Attorney, Agent, or Firm* — Philip H. Burrus, IV

(57) ABSTRACT

There is described a display having a front surface, in which the display comprises a first area of the front surface and a second area of the front surface located adjacent to the first area. A direction of the longer dimension of the first area is substantially orthogonal to a direction of the longer dimension of the second area.

18 Claims, 4 Drawing Sheets

30X70 2mm DISPLAY FITS TWO
16:9 RATIO SCREEN STACKED

ELECTRONIC DEVICE DISPLAY HAVING MULTIPLE PARTITIONS

FIELD OF THE INVENTION

The present invention relates generally to the field of electronic devices and, more particularly, to an electronic device display having multiple partitions for viewing.

BACKGROUND OF THE INVENTION

Electronic devices, such as wrist watches, smart phones, desktop computer, laptop computers, tablet computers, and gaming controllers, are ubiquitous and utilized for many purposes. As the applications of such electronic devices have grown in number and complexity, the desire to facilitate user operations the electronic devices has grown.

Electronic device provide a multitude of content, so it is important to provide the content in an organized manner. Some devices provide multiple displays to partition content, but this approach tends to be more expensive than a single display. Other devices provide a toolbar at the top of the display, but a toolbar can provide only a limited amount of information. Of course, other methods of partitioning a display may be applied but, in each case, the content must be adjusted to conform to the boundaries of the partitions.

For at least these reasons, it would be advantageous to develop one or more additional new or enhanced methods for providing users of electronic devices multiple options for viewing multiple content at a display.

DETAILED DESCRIPTION OF THE EMBODIMENTS

One aspect is a display having a front surface, in which the display comprises a first area of the front surface and a second area of the front surface located adjacent to the first area. A direction of the longer dimension of the first area is substantially orthogonal to a direction of the longer dimension of the second area.

Another aspect is an electronic device comprising a display having a front surface. The front surface of the display comprises a first area of the front surface and a second area of the front surface located adjacent to the first area. A direction of the longer dimension of the first area is substantially orthogonal to a direction of the longer dimension of the second area.

Yet another aspect is a display having a front surface. The display comprises a first area of the front surface, a second area of the front surface located adjacent to the first area, a substantially linear boundary where the first and second areas meet, and a curved portion of the display. The curved portion has a greater curvature than the portions of the display on either side of the curved portion. The substantially linear boundary of the front surface corresponds substantially to the curved portion of the display.

Figure 1:
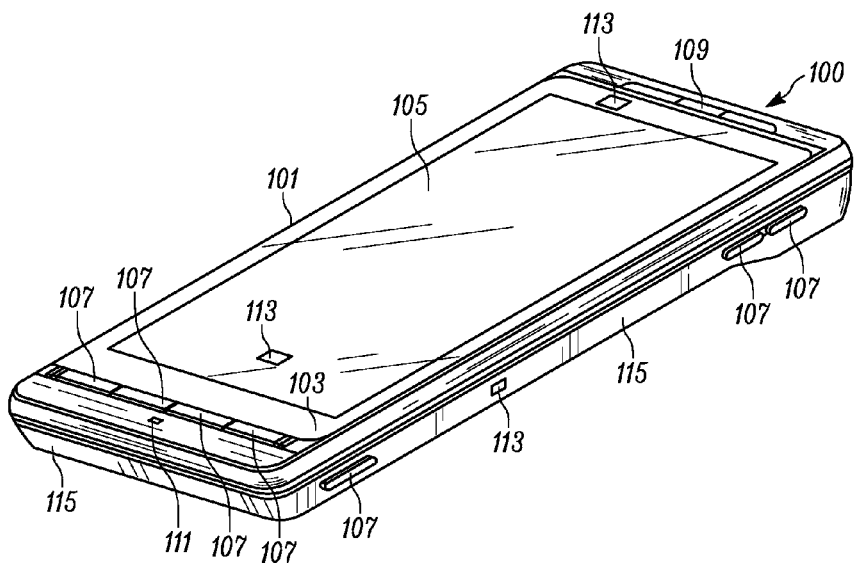
FIG. 1 is a perspective view of an example electronic device.

Referring to FIG. 1, there is illustrated a perspective view of an example electronic device 100. Examples of the electronic device 100 include, but are not limited to, computers, wireless devices, tablet computing devices, personal digital assistants, personal navigation devices, touch screen input device, touch or pen-based input devices, portable video and/or audio players, and the like. It is to be understood that the electronic device 100 may take the form of a variety of form factors, such as, but not limited to, bar, tablet, flip/clam, slider, rotator, and wearable form factors.

For one embodiment, the electronic device 100 has a housing 101 comprising a front surface 103 which includes a visible display 105 and a user interface. For example, the user interface may be a touch screen including a touch-sensitive surface that overlays the display 105. For another embodiment, the user interface or touch screen of the electronic device 100 may include a touch-sensitive surface supported by the housing 101 that does not overlay any type of display. For yet another embodiment, the user interface of the electronic device 100 may include one or more input keys 107. Examples of the input key or keys 107 include, but are not limited to, keys of an alpha or numeric keypad or keyboard, a physical keys, touch-sensitive surfaces, mechanical surfaces, multipoint directional keys and side buttons or keys 107. The electronic device 100 may also comprise apertures 109, 111 for audio output and input at the surface. It is to be understood that the electronic device 100 may include a variety of different combination of displays and interfaces.

The electronic device 100 includes one or more sensors 113 positioned at or within an exterior boundary of the housing 101. For example, as illustrated by FIG. 1, the sensor or sensors 113 may be positioned at the front surface 103 and/or another surface (such as one or more side surfaces 115) of the exterior boundary of the housing 101. The sensor or sensors 113 may include an exterior sensor supported at the exterior boundary to detect an environmental condition associated with an environment external to the housing. The sensor or sensors 113 may also, or in the alternative, include an interior sensors supported within the exterior boundary (i.e., internal to the housing) to detect a condition of the device itself. Examples of the sensors 113 are described below in reference to FIG. 2.

Figure 2:
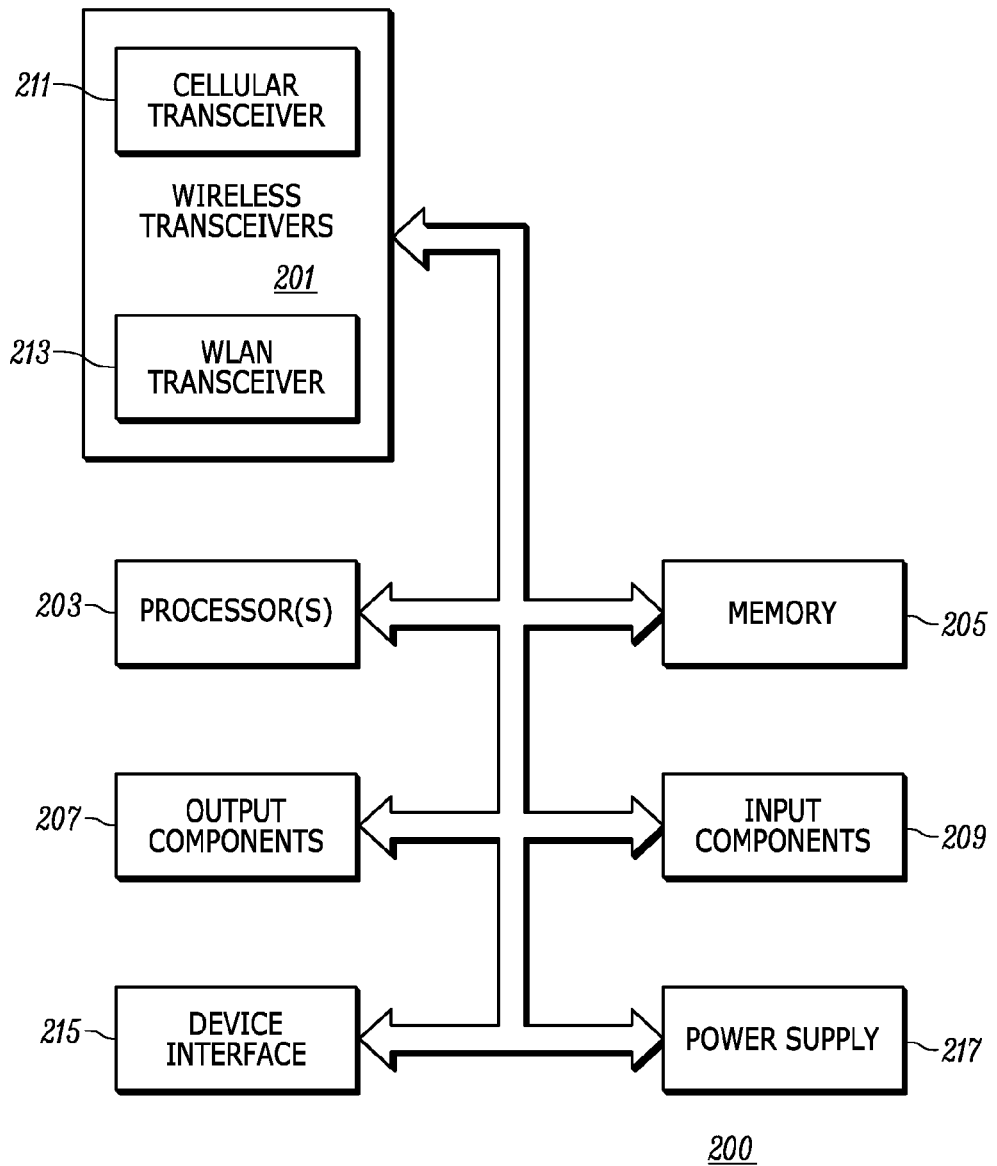
FIG. 2 is a block diagram of example components of an embodiment in accordance with the present invention.

Referring to FIG. 2, there is shown a block diagram representing example components 200 that may be used for one or more embodiments. The example components may include one or more communication components 201, one or more processors 203, one or more memories 205, one or more output components 207, and one or more input components 209. Each component may include a user interface that comprises one or more input components 209. Each communication component 201 may include a wireless receiver, transmitter or transceiver. Each communication component 201 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, or IEEE 802.16) and their variants, as represented by cellular transceiver 211. Each communication component 201 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology, as represented by WLAN transceiver 213. Also, each communication component 201 may be a receiver, a transmitter or both.

The example components 200 may further include a device interface 215 to provide a direct connection to auxiliary components or accessories for additional or enhanced functionality. In addition, the example components 200 may include a power source or supply 217, such as a portable battery, for providing power to the other example components and allow portability of the electronic device 100.

The processor 203 may generate commands based on information received from one or more communication components 201 and/or one or more input components 209. The processor 203 may process the received information alone or in combination with other data, such as the information stored in the memory 205. Thus, the memory 205 of the example components 200 may be used by the processor 203 to store and retrieve data. The data that may be stored by the memory 205 include, but is not limited to, operating systems, applications, and data. Each operating system includes executable code that controls basic functions of the electronic device, such as interaction among the components of the example components 200, communication with external devices via each communication component 201 and/or the device interface (see below), and storage and retrieval of applications and data to and from the memory 205. The memory 205 includes multiple applications, and each application includes executable code utilizes an operating system to provide more specific functionality for the electronic device. Data is non-executable code or information that may be referenced and/or manipulated by an operating system or application for performing functions of the electronic device.

The input components 209, such as components of the user interface, may produce an input signal in response to detecting a predetermined gesture at a first input component 219, such as a gesture sensor. An example of a gesture sensor is, but not limited to, a touch-sensitive sensor having a touch-sensitive surface substantially parallel to the display. The touch-sensitive sensor may include at least one of a capacitive touch sensor, a resistive touch sensor, an acoustic sensor, an ultrasonic sensor, a proximity sensor, or an optical sensor.

The input components 209 may also include other sensors, such as the visible light sensor, the motion sensor and the proximity sensor described above. Likewise, the output components 207 of the example components 200 may include one or more video, audio and/or mechanical outputs. For example, the output components 207 may include a video output component such as a cathode ray tube, liquid crystal display, plasma display, incandescent light, fluorescent light, front or rear projection display, and light emitting diode indicator. Other examples of output components 207 include an audio output component such as a speaker, alarm and/or buzzer, and/or a mechanical output component such as vibrating or motion-based mechanisms.

It is to be understood that FIG. 2 is provided for illustrative purposes only and for illustrating components of an electronic device, and is not intended to be a complete schematic diagram of the various components required for the electronic device. Therefore, a electronic device may include various other components not shown in FIG. 2, or may include a combination of two or more components or a division of a particular component into two or more separate components, and still be within the scope of the present invention.

Figure 3:
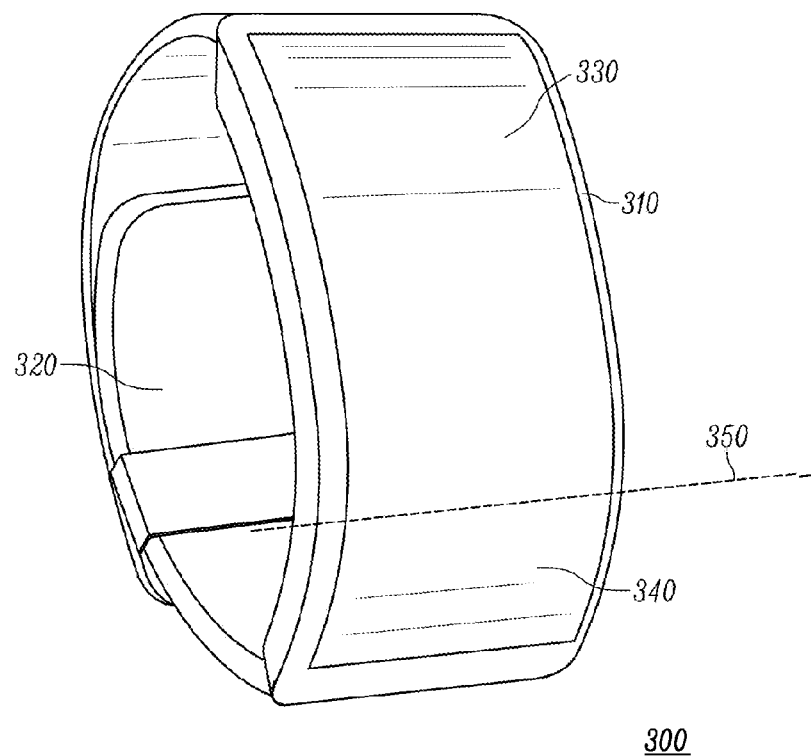
FIG. 3 is a perspective view of another embodiment in accordance with the present invention.

Referring to FIG. 3, there is provided a perspective view of an embodiment in accordance with the present invention. There is shown an electronic device 300 comprising a housing 310 and an adjustable support mechanism, such as an adjustable band 320. The housing 310 includes a display having a front surface, 330, 340, in which the front surface of the display comprises a first area 330 of the front surface and a second area 340 of the front surface located adjacent to the first area. The front surface includes a substantially linear boundary 350 where the first and second areas 330, 340 meet. Also, a curved portion of the display has a greater curvature than the portions of the display on either side of the curved portion. The substantially linear boundary 350 of the front surface corresponds substantially to the curved portion of the display.

Figure 4:
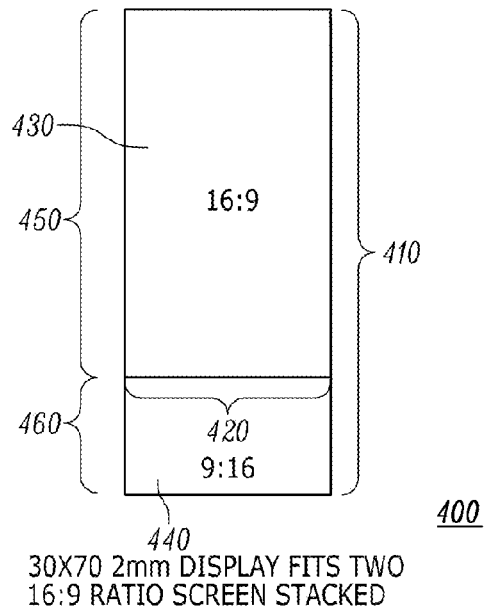
FIG. 4 is a planar view of the display of the embodiment of FIG. 3.

Referring to FIG. 4, there is shown a planar view of a front surface 400 of a display in accordance with the present invention. The front surface includes two dimensions in the form of length 410 and width 420. For the embodiment, shown in FIG. 4 the length is vertically shown and about 70.2 mm, and the width is horizontally shown and is about 30 mm. However, the more important aspect of the front surface is its ability to accommodate multiple partitions, in which each partition has a specific aspect ratio associated with common content of the industry.

The front surface 400 is partitioned into two are more areas. For example, as shown in FIG. 4, the front surface 400 of the display comprises a first area 430 of the front surface and a second area 440 of the front surface located adjacent to the first area. Each area 430, 440 of the front surface 400 includes a direction of a longer dimension which corresponds to the longer of the two dimensions of the area. For example, for the embodiment shown in FIG. 4, the longer dimension of the first area 430 is vertical, so the direction of the longer dimension of the first area is in the vertical direction. Likewise, for the embodiment shown in FIG. 4, the longer dimension of the second area 440 is horizontal, so the direction of the longer dimension of the second area is horizontal. Thus, for this example, a direction of the longer dimension of the first area 450 (shown vertically in FIG. 1) is substantially orthogonal to a direction of the longer dimension of the second area 340 (shown horizontally in FIG. 1).

As stated above, the front surface 400 of the display comprises a first area 430 of the front surface and a second area 440 of the front surface located adjacent to the first area. The first area 430 of the front surface has a first longer side 450 and a first shorter side (represented by 420), and the second area 440 of the front surface having a second longer side (also represented by 420) and a second shorter side 460. The first shorter side is located adjacent to the second longer side. A length of the first shorter side and a length of the second longer side are substantially similar, thus commonly represented by 420. The front surface 400 has a third longer side 410 and a third shorter side (represented by 420), and a combination of a length of the first longer side 450 and a length of the second shorter side 460 is substantially similar to a length of the third longer side 410.

As noted above, the aspect ratio of each of the first and second areas 430, 440, utilizes commonly used aspect ratios of the industry. For example, the two common videographic aspect ratios are the universal video format of the 20th century, i.e., 4:3, and the universal video format for high-definition television and European digital television, i.e., 16:9. The first area 430 of the front surface 400 has a first aspect ratio, wherein the first aspect ratio is selected from the group consisting of 4:3, 5:4, 16:9, 16:10, and 256:135.

Likewise, the second area of the front surface has a second aspect ratio, wherein the first aspect ratio is selected from the group consisting of 4:3, 5:4, 16:9, 16:10, and 256:135. The first aspect ratio and the second aspect ratio are substantially similar.

Figure 5:
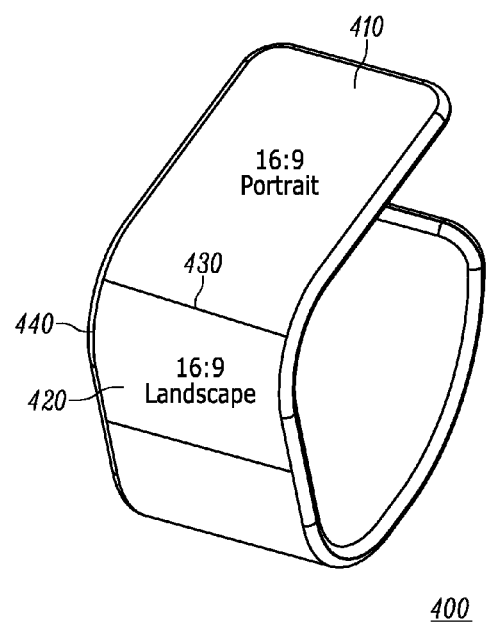
FIG. 5 is a perspective view of yet another embodiment in accordance with the present invention.

Referring to FIG. 5, there is provided another embodiment in accordance with the present invention. For this embodiment, similar to other embodiments, the housing includes a display having a front surface, 410, 420, in which the front surface of the display comprises a first area 410 of the front surface and a second area 420 of the front surface located adjacent to the first area. The front surface includes a substantially linear boundary 430 where the first and second areas 410, 420 meet. Also, a curved portion 440 of the display has a greater curvature than the portions of the display on either side of the curved portion. The substantially linear boundary 430 of the front surface corresponds substantially to the curved portion 440 of the display.

In the specification herein, specific embodiments are described. However, one of ordinary skill in the art appreciates that various modifications and changes can be made without departing from the scope of the invention as set forth herein. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

For the descriptions herein, it can be seen that various features are grouped together in various embodiments for the purpose of streamlining the disclosure. This method of disclosure is not to be interpreted as reflecting an intention that the claimed embodiments require more features than are expressly recited in each claim.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A display having a front surface, the display comprising:
   a first area of the front surface;
   a second area of the front surface located adjacent to the first area, wherein a direction of the longer dimension of the first area is substantially orthogonal to a direction of the longer dimension of the second area, and wherein the first area of the front surface and the second area of the front surface having a common boundary where the first and second areas meet.

2. The display of claim 1, wherein:
   the first area of the front surface having a first longer side and a first shorter side; and
   the second area of the front surface having a second longer side and a second shorter side, wherein the first shorter side is located adjacent to the second longer side.

3. The display of claim 2, wherein:
   a length of the first shorter side and a length of the second longer side are substantially similar.

4. The display of claim 3, wherein:
   the front surface has a third longer side and a third shorter side, and a combination of a length of the first longer side and a length of the second shorter side is substantially similar to a length of the third longer side.

5. The display of claim 1, wherein:
   the first area of the front surface has a first aspect ratio, wherein the first aspect ratio is selected from the group consisting of 4:3, 16:9, and 16:10;

the second area of the front surface has a second aspect ratio, wherein the second aspect ratio is selected from the group consisting of 4:3, 16:9, and 16:10.

6. The display of claim 5, wherein:
the first aspect ratio and the second aspect ratio are substantially similar.

7. An electronic device comprising:
a display having a front surface, the front surface of the display comprising:
   a first area of the front surface; and
   a second area of the front surface located adjacent to the first area,
   wherein a direction of the longer dimension of the first area is substantially orthogonal to a direction of the longer dimension of the second area, and wherein the first area of the front surface and the second area of the front surface having a common boundary where the first and second areas meet.

8. The electronic device of claim 7, wherein:
the first area of the front surface having a first longer side and a first shorter side; and
the second area of the front surface having a second longer side and a second shorter side, wherein the first shorter side is located adjacent to the second longer side.

9. The electronic device of claim 8, wherein:
a length of the first shorter side and a length of the second longer side are substantially similar.

10. The electronic device of claim 9, wherein:
the front surface has a third longer side and a third shorter side, and a combination of a length of the first longer side and a length of the second shorter side is substantially similar to a length of the third longer side.

11. The electronic device of claim 7, wherein:
the first area of the front surface has a first aspect ratio, wherein the first aspect ratio is selected from the group consisting of 4:3, 16:9, and 16:10;
the second area of the front surface has a second aspect ratio, wherein the second aspect ratio is selected from the group consisting of 4:3, 16:9, and 16:10.

12. The display of claim 11, wherein:
the first aspect ratio and the second aspect ratio are substantially similar.

13. A display having a front surface, the display comprising:
a first area of the front surface;
a second area of the front surface located adjacent to the first area;
a substantially linear boundary where the first and second areas meet; and
a curved portion of the display having a greater curvature than the portions of the display on either side of the curved portion, wherein the substantially linear boundary of the front surface corresponds substantially to the curved portion of the display.

14. The display of claim 13, wherein:
the first area of the front surface having a first longer side and a first shorter side; and
the second area of the front surface having a second longer side and a second shorter side, wherein the first shorter side is located adjacent to the second longer side.

15. The display of claim 14, wherein:
a length of the first shorter side and a length of the second longer side are substantially similar.

16. The display of claim 15, wherein:
the front surface has a third longer side and a third shorter side, and a combination of a length of the first longer side and a length of the second shorter side is substantially similar to a length of the third longer side.

17. The display of claim 13, wherein:
the first area of the front surface has a first aspect ratio, wherein the first aspect ratio is selected from the group consisting of 4:3, 16:9, and 16:10;
the second area of the front surface has a second aspect ratio, wherein the second aspect ratio is selected from the group consisting of 4:3, 16:9, and 16:10.

18. The display of claim 17, wherein:
the first aspect ratio and the second aspect ratio are substantially similar.

* * * * *